Dec. 18, 1923. 1,478,278
J. HARLOW
APPARATUS FOR MAKING MOVING PORTRAITS
Filed Nov. 16, 1920 3 Sheets-Sheet 2
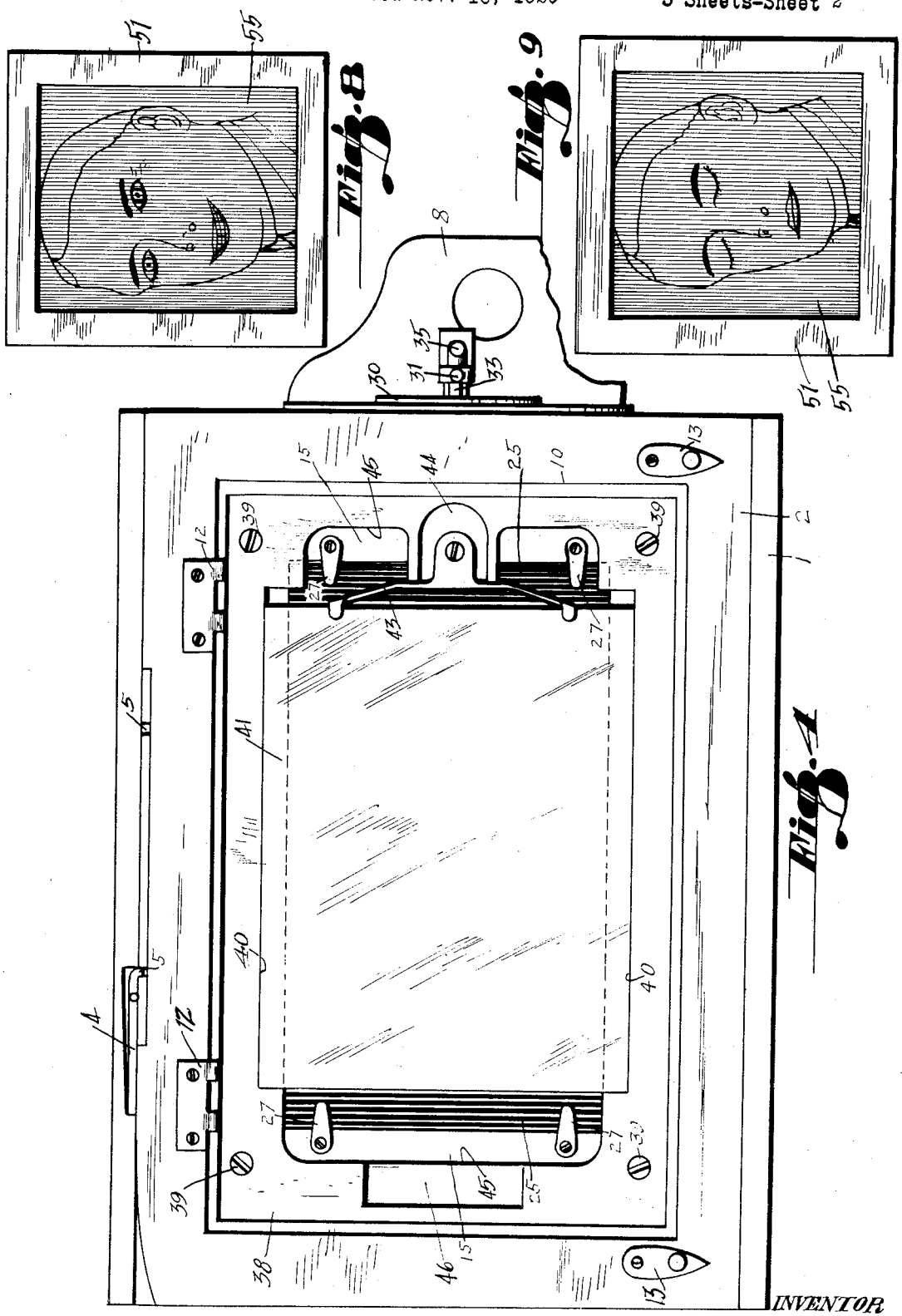
INVENTOR
John Harlow
by Hazard & Miller
ATTYS Dec. 18, 1923.                                               1,478,278
J. HARLOW
APPARATUS FOR MAKING MOVING PORTRAITS
Filed Nov. 16, 1920              3 Sheets-Sheet 3
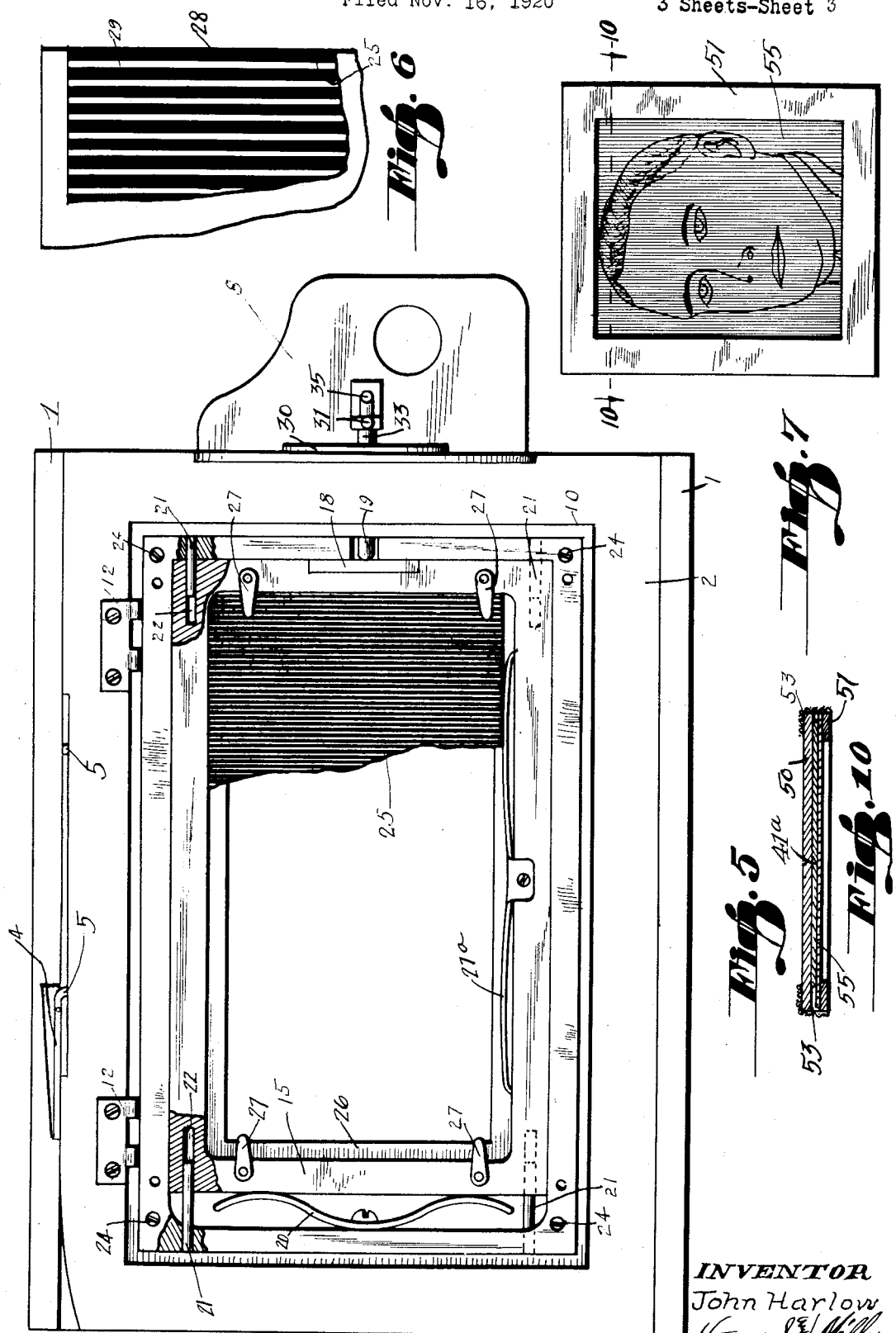
INVENTOR
John Harlow
by Hazard & Miller
ATT'YS Patented Dec. 18, 1923.

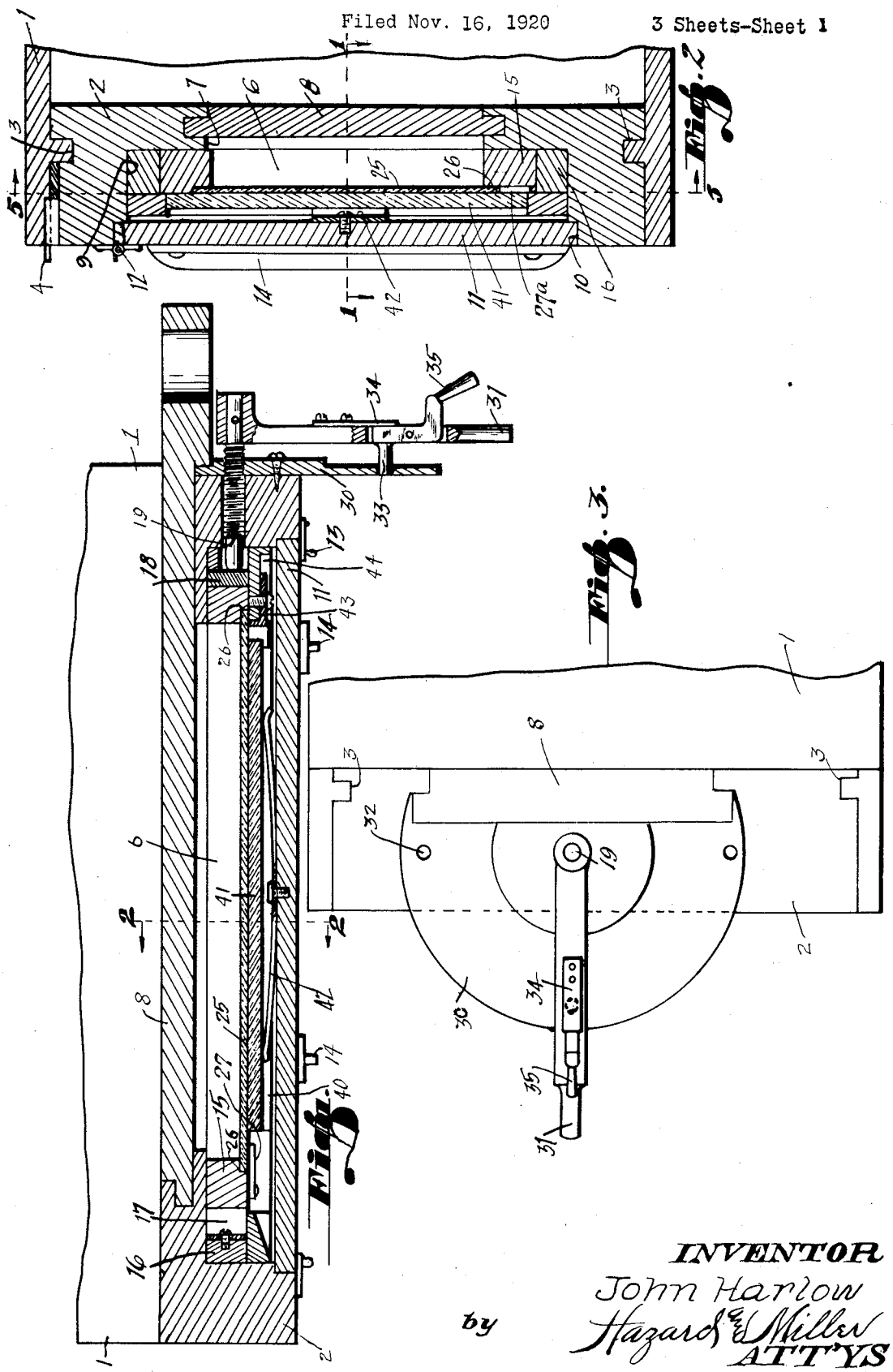

1,478,278

UNITED STATES PATENT OFFICE.

JOHN HARLOW, OF OCEANPARK, CALIFORNIA, ASSIGNOR OF ONE-HALF TO HERMAN PAINE, OF LOS ANGELES, CALIFORNIA.

APPARATUS FOR MAKING MOVING PORTRAITS.

Application filed November 16, 1920. Serial No. 424,404.

*To all whom it may concern:*

Be it known that I, JOHN HARLOW, a subject of the King of Great Britain, residing at Oceanpark, in the county of Los Angeles and State of California, have invented new and useful Improvements in Apparatus for Making Moving Portraits, of which the following is a specification.

It is the object of this invention to provide an apparatus whereby an animate object may be photographed in slightly changed positions, the various exposures being combined in a single print so that when the print is moved with relation to a screen provided over the same the effect of a moving animate object will be obtained.

The photographic print obtained by means of the improved apparatus is mounted in a frame so that a screen supported by the frame overlies the print. This screen comprises a transparent plate having opaque lines thereon in laterally spaced relation so as to disclose the photographic print only through the spaces between said lines.

As previously stated, the photographic print comprises a plurality of exposures showing an animate object in different positions, and the respective exposures are so printed to form the composite print that when said print is in one position beneath its screen, one exposure will be disclosed through the transparent spaces between the opaque lines, and when the screen and print are shifted laterally relative to one another the various other pictures forming the composite print will be disclosed respectively through the transparent spaces of the screen.

This successive displaying of an animate object in different positions will produce the effect of a moving photograph. The present invention provides for a camera attachment whereby photographic films may be so exposed as to form composite negatives, which when printed will provide a composite print having the various exposures arranged to be displayed, as above set forth.

The invention will be readily understood from the following description of the accompanying drawings, in which;

Figure 1 is a horizontal section through the camera attachment taken on the line 1—1 of Fig. 2.

Fig. 2 is a vertical section taken on the line 2—2 of Fig. 1.

Fig. 3 is an end elevation of the camera attachment.

Fig. 4 is a rear view of the same with the door removed and showing the photographic film.

Fig. 5 is a similar view with the door and the film carrying frame removed, and the screen employed in front of the film, partly broken away.

Fig. 6 is a fragmentary plan view of a portion of the screen employed in connection with the photographic film.

Figs. 7, 8 and 9 are diagrammatical front elevational views showing the picture taken by the improved apparatus mounted in its frame with the latter and the picture relatively shifted so as to display the various exposures of the composite print forming the picture.

Fig. 10 is a transverse section on the line 10—10 of Fig. 7.

The camera employed for taking the pictures may be of any preferred construction having a usual camera box 1. The rear end of the camera box is open and is adapted to receive a frame 2 carrying the photographic film plate, and the mechanism affording the means whereby the desired exposures may be taken upon the film plate. The frame 2 may be moved transversely relative to the camera box by means of tongue and groove guideways 3, and in the present instance I have shown a frame laterally shiftable to two different positions in order that the exposures necessary to form one picture may be made upon a film at one end of the film plate, and the film plate then shifted so as to make the necessary exposures for another picture upon a film at the opposite end of the film plate. A catch 4 is provided in the camera box so as to engage the frame 2 in one or the other of notches 5 provided therein so as to accurately position the shiftable frame 2 in one or the other of its positions for exposure of the films comprising the film plate.

By this arrangement a saving of time and material is affected, since it is not necessary to place a new film in position within the camera for each picture made by the same. It will be understood, however, that the invention is applicable to a mechanism wherein such a single picture film is employed and is also applicable to a device wherein a film plate is employed which may be shifted to more than two different positions in order to provide the necessary exposure for more than two pictures upon a single plate.

The frame 2 incloses an opening 6 for the exposure of the film plate, and the inner portion of said opening, as shown at 7, is, preferably, arranged to receive a usual opaque screen 8, while the outer portion of the opening is enlarged as shown at 9 in order to form a space in which is received frames carrying the film plate and the screen employed in connection with the same for making the necessary exposures. The outer end of opening 6 is still further enlarged as shown at 10, in order to receive a door 11 hinged at its upper end to the frame 2 as shown at 12. The door may be retained in closed position by means of the pivotal clips 13 and is, preferably, formed with strengthening members 14 extending across the same.

The frame carrying the screen of the mechanism is shown at 15 received in space 9 against the base of the same. This frame is laterally shiftable in the space 9, a second frame 16 surrounding the same within the space 9 and having an opening 17 laterally extended beyond the length of frame 15 to permit of the lateral movement of this latter frame. At one end a wear plate 18 is provided on frame 15 between the latter and frame 16, and a screw rod 19 extends through the frame 2 and frame 16 so as to abut against the wear plate and thereby cause lateral movement of frame 16 as the screw bolt is rotated. The frame 15 is yieldably held against its screw bolt by means of a leaf spring 20 fixed upon frame 16 and positioned between said frame and the end of frame 15 which is opposite the end thereof engaged by the screw bolt. The frame 15 may be guided in its lateral adjustment relative to frame 16 by means of pins 21 upon frame 16 received in recesses 22 provided in frame 15. The frame 16 may be retained in the frame 2 by means of screws 24, and the frame 15 will in turn be held in position within the frame 16 by means of the pins and recesses 21 and 22.

The screen carried by frame 15 covers the opening defined by this frame and is shown as a transparent plate 25 which is, preferably, held in a recess 26 at the edge of the opening through said frame by means of pivotal clips 27, and by means of the leaf spring 27ª. The transparent plate is provided with opaque lines 28 extending vertically of the plate and spaced apart as shown at 29. The transparent spaces between the lines 28 are one-half the width of the lines. By this arrangement an exposure may be made through the transparent spaces of the screen so as to leave vertical unexposed portions upon the film between each of the exposed spaces and of twice the width of the latter. The screen is then shifted so that the opaque lines cover the previously exposed spaces and half of the previously unexposed spaces. As a result exposed spaces will be provided at the second half of the previously unexposed portions of the film, and a second exposure is then made through these spaces with the subject being photographed in a slightly different position. The screen is then again shifted so that the opaque lines will cover the two first exposures and leave the transparent spaces in alinement with the remaining portions of the film not already exposed. A third exposure is then made, the subject being photographed in a still different position.

As previously stated, the necessary transverse shifting of the screen is caused by rotating bolt 19, the latter being threaded through a plate 30 projecting from the end of frame 2. The bolt is provided with an actuating handle 31 and is, preferably, so threaded that two successive quarter turns of the bolt will shift the screen from its first position to its two succeeding positions. The plate 30 may be formed as an arcuate plate having recesses 32 adapted to be engaged by handle 31 for accurately positioning the bolt in the various positions to which it is turned. For this purpose a pin 33 is pivoted upon handle 31 so as to be engaged in any one of the recesses 32, said pin being yieldably urged into engaging position by means of a spring 34. The pin is also provided with an actuating handle 35 for withdrawing it from engaging position so that the bolt may be rotated to its succeeding position.

The frame carrying the photographic film plate is shown at 38 mounted in the space 9 against the frames 15 and 16. This frame may be fixed with relation to the frame 16 by means of screws 39. The central opening 40 of this frame overlies the screen 25 and is adapted to receive the photographic film plate 41. This film plate is yieldably urged against the screen 25 by means of the leaf spring 42 carried by door 11 and also by means of a spring clip 43 engaging the edge of the film plate and mounted in a recess 44 of the frame 38. The frame 38 is cut away at the ends of the film plate 41 as shown at 45 in order to gain access to the pivotal clips 27 retaining the screen 25 in position. A finger space 46 is also provided in frame 38 beyond the cut away portion 45 which is opposite clip 43 in order that the screen may be readily removed from its frame after the film plate has been removed.

It will be understood that after making the various exposures upon a film, as above described, a composite negative will be formed. This negative, when printed, provides a composite print showing the subject photographed in its different positions.

The print of one exposure will consist of transversely spaced strips of the print as shown in Fig. 8. The prints of the other exposures will consist of similar transversely spaced strips of the print as shown in Figs. 9 and 10, and the strips of the various prints will be positioned alongside of one another. The composite print is fixed upon a rigid backing 50, and a frame 51 is positioned over the print with a screen 52 fixed to the inner surface of this frame and overlying the print. The frame and its screen are laterally shiftable with relation to the print and its backing as by providing a flexible binding 53 overlying the side edges of the frame and backing so as to permit of slight relative lateral movement between the frame and the backing.

The screen carried by frame 51 is a transparent plate having transversely spaced opaque vertical lines 55 upon the same. This screen is arranged similar to the screen 25 with the opaque lines twice the width of the transparent spaces between the same. By this arrangement with the screen in one position relative to the composite print, one exposure of the print will be displayed, and by succeeding lateral shifts of the frame carrying the screen relative to the backing carrying the print, the other exposures of the print may be successively displayed, it being understood that each time that one of the exposures is displayed the other exposures are masked by the opaque lines. By holding the photograph in the hand and rapidly shifting the frame and its screen relative to the backing and its print, the various exposures may be quickly and successively displayed, and since the various exposures show the subject of the photograph in various positions, the effect of a moving photograph is obtained.

Various changes may be made without departing from the spirit of the invention as claimed.

What is claimed is:

1. A multi-exposure film plate holder, comprising a frame having a forward opening and an enlarged rear opening forming a recess, an aperture casing in said recess, a screen frame having a multi-exposure screen, said frame being longitudinally slidably mounted in and normally held by yielding means in one end of said aperture, means for longitudinally shifting said screen frame, an apertured film plate frame behind said screen and fixed with relation to said holder and adapted to hold a film plate, and a hinged door for said holder and having means for pressing said film plate to said screen.

2. A multi-exposure film plate holder, comprising a longitudinally slidably mounted frame, said frame having an opening, a screen frame and a film plate frame within said opening, and means for retaining said holder in different positions with respect to a camera so that more than one set of exposures can be taken.

3. A multi-exposure film plate holder having an opening and a screen carrying frame mounted in said opening, said frame comprising an apertured frame adapted to be held in said opening, and being longitudinally slidably supported by guide pins extending inwardly from said apertured frame and adapted to engage guide recesses in said screen carrying frame, a compression spring between the outer and inner ends of said screen carrying and apertured frames, said carrying frame having a recess adapted to receive a multi-exposure screen and means for holding said screen in position.

In testimony whereof I have signed my name to this specification.

JOHN HARLOW.